United States Patent [19]
Fork

[11] Patent Number: 5,861,991
[45] Date of Patent: Jan. 19, 1999

[54] LASER BEAM CONDITIONER USING PARTIALLY REFLECTIVE MIRRORS

[75] Inventor: David K. Fork, Palo Alto, Calif.

[73] Assignee: Xerox Corporation, Stamford, Conn.

[21] Appl. No.: 769,360

[22] Filed: Dec. 19, 1996

[51] Int. Cl.[6] ............................. G02B 27/10; G02B 27/14
[52] U.S. Cl. ............................................ 359/618; 359/629
[58] Field of Search ................................. 359/619, 629, 359/618; 372/9, 93, 99, 107, 92

[56] References Cited

U.S. PATENT DOCUMENTS

| | | | |
|---|---|---|---|
| 4,916,712 | 4/1990 | Bender | 372/75 |
| 5,153,773 | 10/1992 | Muraki et al. | 359/619 |
| 5,224,200 | 6/1993 | Rasmussen et al. | 385/146 |
| 5,343,489 | 8/1994 | Wangler | 372/93 |
| 5,661,737 | 8/1997 | Hecht et al. | 372/23 |

*Primary Examiner*—Georgia Epps
*Assistant Examiner*—Ricky Mack
*Attorney, Agent, or Firm*—William Propp

[57] ABSTRACT

A laser beam conditioner consists of a partially reflective surface having a uniform reflectivity of approximately 38.2 percent and a totally reflective surface on opposite sides of a substrate. A coherent light beam incident onto the partially reflective surface of the laser beam conditioner will be partially reflected and partially transmitted. The partially transmitted portion of the coherent light beam will be multiply reflected between the totally reflective mirror and the partially reflective mirror within the beam conditioner, with a portion of light transmitted through the partially reflective mirror at each multiple reflection. The initially reflected portion of the coherent light beam and the transmitted portions of the multiply reflected beams form a conditioned light beam for a homogenizer. The partially reflective surface and the totally reflective surface are slightly less than parallel in order to introduce a minute angular spread among the delayed components of the multiply reflected beam. The spacing between the partially and totally reflective surfaces is at least half the coherence length of the laser beam.

24 Claims, 4 Drawing Sheets

LASER BEAM CONDITIONER USING PARTIALLY REFLECTIVE MIRRORS

BACKGROUND OF THE INVENTION

This invention relates to a laser beam conditioner which is to be used in conjunction with a laser beam homogenizer for the purpose of reducing the interference contrast of the homogenized laser beam and so providing a more uniform intensity profile to the homogenized laser beam More particularly, this invention relates to a laser beam conditioner using partially reflective mirrors.

Excimer lasers have a wide range of applications involving etching and shaping of a variety of materials by annealing or ablation. For example, excimer lasers can be used in semiconductor annealing, microphotolithography and photodeposition. Lasers provide an intense light source which can be precision controlled to etch and shape of materials.

However, the effectiveness of an excimer laser in annealing and ablation requires a uniform laser beam profile to produce a smooth and even energy distribution across the material.

Two problems exist in providing a uniform intensity profile to a laser beam. First, the beam emitted by an excimer laser has a Gaussian intensity profile, peaking at the center of the beam and gradually decreasing toward the circumference of the beam. Second, the beam emitted by an excimer laser is coherent. A coherent beam has a finite and measurable coherence length. Any overlapping of a coherent beam with itself creates interference standing waves in the beam profile. These interference standing waves create an intensity modulation or an interference fringe pattern in the beam's intensity profile making the profile non-uniform. An ideal laser beam for annealing and ablation has a uniform intensity profile without any interference modulation.

There are numerous ways to provide a uniform intensity profile to a laser beam emitted by an excimer laser. Most beam homogenizers, particularly the economical and easy to manufacture ones, require overlapping the laser beam. In a typical homogenizer, the laser beam is divided into multiple wavelets, which are then redirected to different positions and overlapped back to produce a beam with a more uniform, less Gaussian intensity profile. This process is referred to as beam folding. Because beam folding produces interference standing waves and an interference fringe pattern, it is desirable to provide a beam conditioner which precedes the homogenizer in the optical path of the laser beam and which reduces the interference contrast caused by the homogenizer.

One means to reduce the interference contrast of the beam profile is found in U.S. Pat. No. 5,153,773 (hereinafter referred to as the "Muraki et al." patent). The beam exposure apparatus of Muraki et al. consists of a polarization beam splitter and two mirrors. A coherent light beam from an excimer laser is inputted to the polarization beam splitter. The S-polarized portion of the light beam is reflected by the beam splitter while the P-polarized portion of the light beam is transmitted through the beam splitter. The transmitted P-polarized beam is reflected by the two mirrors back to the polarization beam splitter. The P-polarized beam is again transmitted through the beam splitter to overlap the S-polarized beam.

The optical path difference (OPD) in Muraki et al. between the initial reflected beam and the initial transmitted beam which circulates once between the mirrors and then emerges from the beam splitter is greater than the coherence length of the laser beam. Accordingly, the intensity profiles of the two beams will sum incoherently to reduce the coherence of the resulting beam while improving the homogeneity of the beam.

Muraki et al. also provides an alternate means of beam homogenizing by using a single polarizing beam splitter prism rather than the three element apparatus of the polarizing beam splitter and the two mirrors.

However, a polarizing beam splitter and, more especially, a polarizing beam splitter prism with the necessary high level of optical efficiency for Muraki et al. to work is expensive and difficult to manufacture. Also, additional optical elements such as mirrors are need to make the output homogenized light beam parallel, if not coaxial, with the input beam.

Another arrangement to reduce the coherence of a laser beam is U.S. Pat. No. 5,343,489 (hereinafter referred to as the "Wangler" patent) and U.S. Pat. No. 5,224,200 (hereinafter referred to as the "Rausmussen et al." patent). Wangler and Rasmussen et al. both use two parallel mirrors as a coherence reducer. One mirror is fully reflecting and the other mirror is partially reflecting with the reflectance varying along the length of that mirror either in precise steps or varying in a continuously changing geometric curve. An entering laser beam will reflect between the two mirrors with portions transmitted through the partially reflecting mirror to form a reduced coherent beam.

The inventions of Wangler and Rasmussen et al. are not practical for excimer laser beam conditioning because both inventions expand the beam to a size many times its initial cross section. Typical excimer lasers emit beams with cross sections of several centimeters, and at fluences which make substantial beam condensation impractical due to the damage threshold of most optical coatings. The condenser lens system in Wangler and in Rasmussen et al. needed to focus these expanded beams would become prohibitively large in a device used for excimer laser beam conditioning. Also, the constantly varying reflectance of the partially reflective mirrors in Wangler and in Rasmussen et al. will be expensive and difficult to fabricate.

It is an object of this invention to provide an optically simple laser beam conditioner to be used in conjunction with a laser beam homogenizer which can reduce the interference contrast caused by beam folding while providing a substantially parallel and coaxial beam.

SUMMARY OF THE INVENTION

In accordance with the present invention, a laser beam conditioner consists of a partially reflective surface having a uniform reflectivity of approximately 38.2 percent and a totally reflective surface on opposite sides of a substrate. A coherent light beam incident onto the partially reflective surface of the laser beam conditioner will be partially reflected and partially transmitted. The partially transmitted portion of the coherent light beam will be multiply reflected between the totally reflective mirror and the partially reflective mirror within the beam conditioner with a portion of light transmitted through the partially reflective mirror at each multiple reflection. The initially reflected portion of the coherent light beam and the transmitted portions of the multiply reflected beams form a conditioned light beam for a homogenizer.

The partially reflective surface and the totally reflective surface are slightly less than parallel in order to introduce a minute angular spread among the delayed components of the multiply reflected beam. The spacing between the partially and totally reflective surfaces is at least half the coherence length of the laser beam.

When the laser beam conditioners are used in pairs, the output conditioned beam can be parallel to, but offset from, the input coherent beam. By suitably configuring four laser beam conditioners, the output conditioned beam can be co-axial with the input beam.

Other objects and attainments together with a fuller understanding of the invention will become apparent and appreciated by referring to the following description and claims taken in conjunction with the accompanying drawings.

DESCRIPTION OF THE PREFERRED EMBODIMENT

Figure 1:
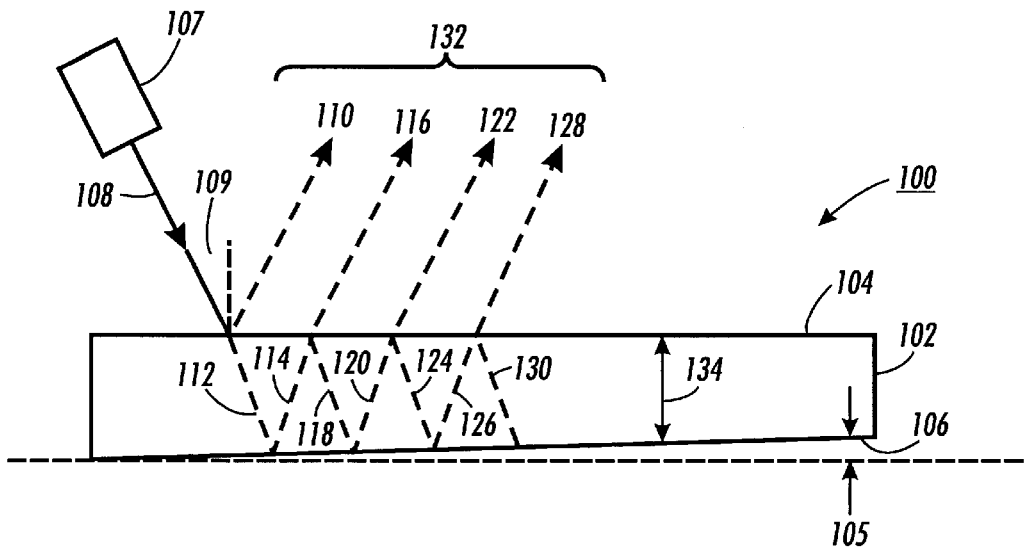
FIG. 1 is a schematic illustration of a beam conditioner having a partially reflective surface and a totally reflective surface formed according to the present invention.

Reference is now made to FIG. 1, wherein there is illustrated a beam conditioner plate 100 as an embodiment of the present invention. The beam coherence reducer plate 100 of FIG. 1 has a glass substrate 102. The top or incident surface 104 of the substrate is partially reflective. This partially reflective surface 104 can be fabricated by a dielectric mirror coating as is known in the art. The opposite surface 106 of the substrate from the partially reflective surface is totally reflective. The totally reflective surface 106 can also be fabricated by a dielectric mirror coating as is known in the art.

The totally reflective surface 106 is slightly less than parallel by an angle 105 with respect to the partially reflective surface 104. Generally, the surface 106 is tilted at an angle 105 less than a degree from parallel toward the surface 104. More typically, the tilt angle 105 is in the microRadians range. The angle 105 is shown exaggerated in the Figure for ease of understanding.

An excimer laser 107 emits a coherent light beam 108 which is incident at a steep angle 109 of incidence to the partially reflective surface 104 of the beam conditioner plate 100. Typically, the angle of incidence of the input beam 108 will be within 5 degrees of normal to the surface 104.

A portion 110 of the incident beam will be reflected by the surface 104 and a portion 112 will be refracted and transmitted through the substrate 102. The refracted transmitted beam 112 will be totally reflected by the totally reflected surface 106. This reflected beam 114 will be transmitted back through the substrate 102 to the partially reflective surface 104 where a portion 116 will be transmitted through the surface 104 and a portion 118 will be reflected into the substrate 102.

Because the partially reflective surface 104 and the totally reflective surface 106 are slightly less than parallel, the transmitted beam 116 (or second emergent reflected beam) is slightly diverging with a minute angular spread from the initial reflected beam 110 (or first emergent reflected beam).

The reflected beam 118 from the partially reflective surface 104 will be transmitted through the substrate 102 and be totally reflected by the totally reflected surface 106. This reflected beam 120 will be transmitted back through the substrate 102 to the partially reflective surface 104 where a portion 122 will be transmitted through the surface 104 and a portion 124 will be reflected into the substrate 102.

The transmitted beam 122 (or third emergent reflected beam) will be slightly diverging from the preceding second emergent reflected beam 116 by a minute angular spread. The third emergent reflected beam 122 will also be slightly diverging from the first emergent reflected beam 110 by twice the minute angular spread since the angular deviation is cumulative.

The reflected beam 124 from the partially reflective surface 104 will be transmitted through the substrate 102 and be totally reflected by the totally reflected surface 106. This reflected beam 126 will be transmitted back through the substrate 102 to the partially reflective surface 104 where a portion 128 will be transmitted through the surface 104 and a portion 130 will be reflected into the substrate 102.

The transmitted beam 128 (or fourth emergent reflected beam) will be slightly diverging from the preceding third emergent reflected beam 122 by a minute angular spread. The fourth emergent reflected beam 128 will also be slightly diverging from the second emergent beam 116 by twice and beam 110 by three times the minute angular spread since the angular deviation is cumulative.

This process of partial reflectance and partial transmittance for a beam within the substrate between the two reflective surfaces could theoretically continue ad infinitum. The laser beam which is not initially reflected from the partially reflective surface 104 will circulate by multiple reflection between the partially reflective surface 104 and the totally reflective surface 106 of the beam conditioner 100 and gradually be transmitted through the partially reflective surface with increasing slight divergence, increasing quantities of optical path difference delay and decreased intensities.

However, after 10 internal reflections, approximately 100 percent of the incident beam 108 has been reflected from the beam conditioner plate 100 by a series of emergent reflected beams 110, 116, 122, 128 et seq to recombine and form a conditioned beam 132.

The optical path difference (OPD) between the first emergent reflective beam 110 and the second emergent reflective beam 116 from the beam conditioner plate 100 is $$OPD = 2nd \cos \phi \qquad \text{Equation 1}$$

where n is the index of refraction of the substrate 102, d is the thickness 134 of the substrate 102 and $\phi$ is angle of refraction of the light beam 112 in the substrate 102.

Since the tilt angle of the reflective surface of the beam conditioner plate is typically less than 1 degree and, more typically, in the microRadians range, the beam conditioner plate is presumed to have a substantially uniform thickness.

In this illustrative embodiment of the beam conditioner plate 100 of FIG. 1, the angle of refraction $\phi$ is 5 degrees, the index of refraction, n, is 1.5, then an optical path difference (OPD) equal to the coherence length (3.1 mm) of the incident light beam 108 requires a substrate thickness, d, of 1.04 mm. Thus, a 1 mm thick optical glass plate would be suitable for the substrate 102 of the beam conditioner plate.

The optical path difference (OPD) between the initial reflected beam 110 and the beam 116 which is internally reflected once within the beam conditioner substrate 102 and then emerges is greater than the coherence length of the laser beam 108. There will be no coherent interference between these two beams, and their intensity patterns will sum incoherently when recombined in the emergent reflected beam 132. This incoherent summing of the two beams serves to reduce the contrast of any interference fringe structure which may exist in the incident beam, thereby improving the homogeneity of the beam intensity.

A similar mutual incoherence will be introduced between the once-internally reflected, second emergent reflected beam 116 and the twice-internally reflected, third emergent reflected beam 122, and so on. Thus, each subsequent emergent reflected beam, though of diminished intensity, will sum its intensity incoherently when recombined in the coherence reduced laser beam 132, further reducing the contrast of any undesired interference fringes in the beam profile pattern.

As noted, the coherent light beam 108 is incident upon the beam conditioner plate 100 which produces a conditioned laser beam 132 consisting of a series of recombined ordered emergent reflected beams 110, 116, 122, 128 et seq.

The first ten orders of the emergent reflected beams have essentially all of the incident light beam intensity. Almost all the energy (greater than 90 percent) is contained in the first three emergent reflected beams.

For the partially reflective surface 104 and the totally reflective surface 106 in the beam conditioner 100 of FIG. 1, the multiply reflected output conditioned beam 132 is combined from a series of beams with power fractions expressed by $\{R, (1-R)^2, R(1-R)^2, R^2(1-R)^2 \ldots\}$ where R is the reflection coefficient of the front partially reflective surface 104.

The optimal reflection coefficient for the partially reflective surface 104 is when the intensity of the directly reflected beam or first order emergent reflected beam 110 is equal to the second order emergent reflected beam 116. The directly reflected beam or first order emergent reflected beam 110 is merely reflected, R. The second order emergent reflected beam 116 is transmitted, T, through the surface 104, reflected at the surface 106 and transmitted, T, a second time in the opposite direction by the surface 104, so T×T or $T^2$. Thus, the optimal reflection coefficient is when $R=T^2$. The reflectance, R, and the transmittance, T, at the partially reflective surface sum to one.

$$R+T=1 \qquad \text{Equation 2}$$

The solution of the two quadratic equations for R is $$R=(3+1-\sqrt{5}) \qquad \text{Equation 3}$$

or the optimal reflectivity for the partially reflective surface of the plate beam conditioner is 0.381966 percent.

Figure 2:
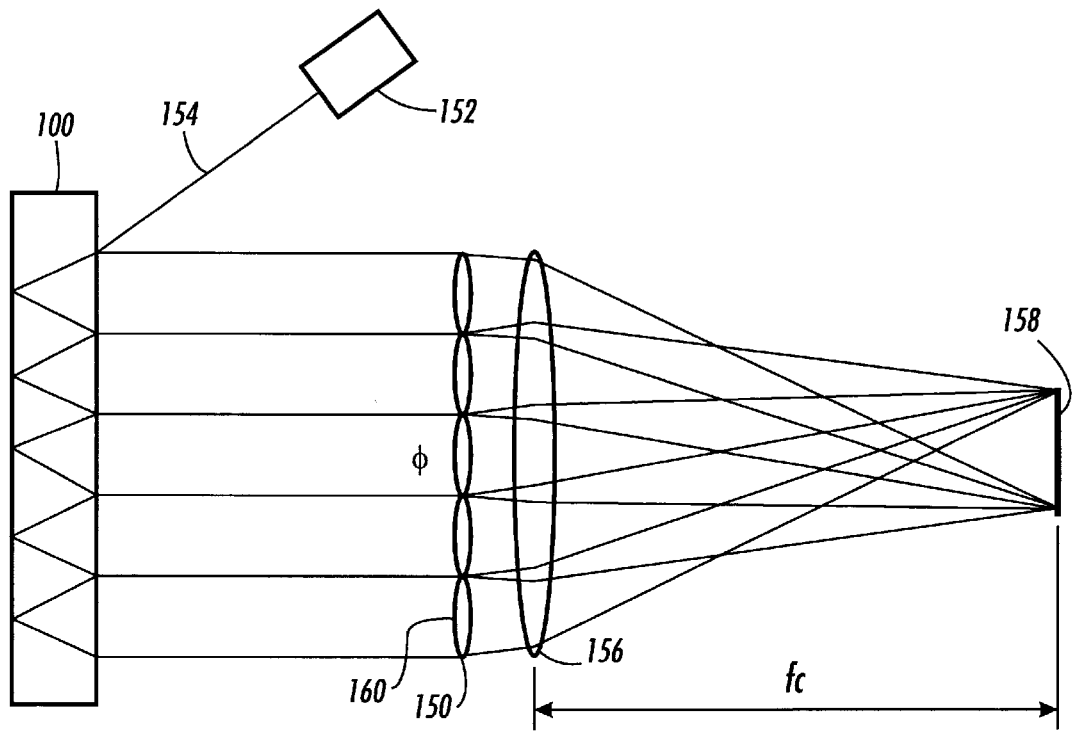
FIG. 2 is a schematic illustration of an optical system of the beam conditioner of FIG. 1 and a fly-eye homogenizer.

The laser beam conditioner 100 of FIG. 1 of the present invention is used in conjunction with a laser beam homogenizer 150 in FIG. 2 to reduce the interference contrast of the homogenized laser beam. The interference effect caused by the beam folding operation in the homogenizer gives rise to modulation or interference fringe patterns in the beam intensity at the object surface.

As illustrated in FIG. 2, an excimer laser coherent light source 152 emits a coherent laser beam 154 of wavelength ($\lambda$). The light beam is reflected from the beam conditioner 100 which conditions the beam and directs it to a fly-eye beam homogenizer 150, such as pending U.S. patent application Ser. No. 08/736,519, commonly assigned as the present application and herein incorporated by reference. The homogenizer 150 folds and homogenizes the laser beam which is then focused by a condenser lens 156 onto an object surface 158. The beam has a uniform intensity profile at the object surface.

Generally, the interference pitch ($\Lambda$) for two beams of wavelength ($\lambda$) overlapping or interfering with a relative angle $2\theta$ is:

$$\Lambda=\lambda/2\theta \qquad \text{Equation 4}$$

For the fly-eye homogenizer 150, generally, the interference pitch ($\Lambda$) is a function of wavelength ($\lambda$) of the coherent light source 152, the focal length ($f_c$) of the condenser lens 156, and the diameter ($\phi$) of each of the microlenses 160 in the fly-eye homogenizer 150. These parameters are related as:

$$\Lambda=\lambda f_c/\phi \qquad \text{Equation 5}$$

The beam conditioner 100 creates a plurality of mutually incoherent beams of light for which the standing wave patterns are shifted. The shifting of the standing wave patterns causes the modulation to become less intense. It is a requirement that the beams be mutually incoherent, otherwise, the modulation intensity would not be reduced. The shifting of the modulation pattern due to the individual beams is accomplished by introducing a small tilt to each beam. A minute tilt of the beam at the beam conditioner surface produces a shift of the interference modulation pattern at the object surface. The relationship between the beam tilt and the interference pattern shift depends on the optical properties of the homogenizer which is used.

The relationship between the beam tilt $\Delta\alpha$ and the interference pattern displacement $\Delta x$ for the homogenizer 150 illustrated in FIG. 2 is:

$$\Delta x=f_c\Delta\alpha \qquad \text{Equation 6}$$

The angular tilt $\alpha_{1/2}$ required to displace the pattern one-half modulation pitch ($\theta/2$) is expressed by:

$$\alpha_{1/2}=\lambda/2\phi \qquad \text{Equation 7}$$

As an example, a XeCl excimer laser emits a coherent light beam with a wavelength of 308 nm. A fly-eye homogenizer has microlenses with 6 mm diameters. The tilt angle of the totally reflective surface of the beam conditioner required to shift the intensity modulation one-half period is 25.7 microRadians.

As noted previously, the slight divergence of each of the emergent reflected beams from the beam conditioner is proportional to the number of times the beam reflects within the beam conditioner. This way, multiple incoherent standing wave patterns are generated, each with a increasing relative spatial shift in the object plane. The tilt angle employed in any one beam conditioner need not be as large as $\alpha_{1/2}$ since homogeneity is achieved by having a multitude of non-interfering beams all combining with spatial shifts up to $\Lambda/2$.

The fly-eye homogenizer can have two microlens arrays spaced apart by a distance, d. Because of the additional optical elements employed in this two bank homogenizer, the half-period tilt angle is expressed as $$\alpha_{1/2} = \frac{\lambda}{2\phi} \left( \frac{f_m}{d - f_m} \right) \qquad \text{Equation 8}$$

where $f_m$ is the focal length of the secondary microlenses.

As illustrated in FIGS. 1 and 2, a single beam conditioner plate will reflect an output conditioned beam in approximately the opposite direction from the input coherent beam. In most optical systems, it is preferred that the output beam be parallel, if not coaxial, to the input beam. Beam conditioners formed from two or four beam conditioner plates in series provide an output beam which is parallel and coaxial to the input beam. Two or four plate beam conditioners also further condition the beam for the homogenizer to reduce the interference contrast of the homogenized laser beam and so provide a more uniform intensity profile to the homogenized laser beam.

Figure 3:
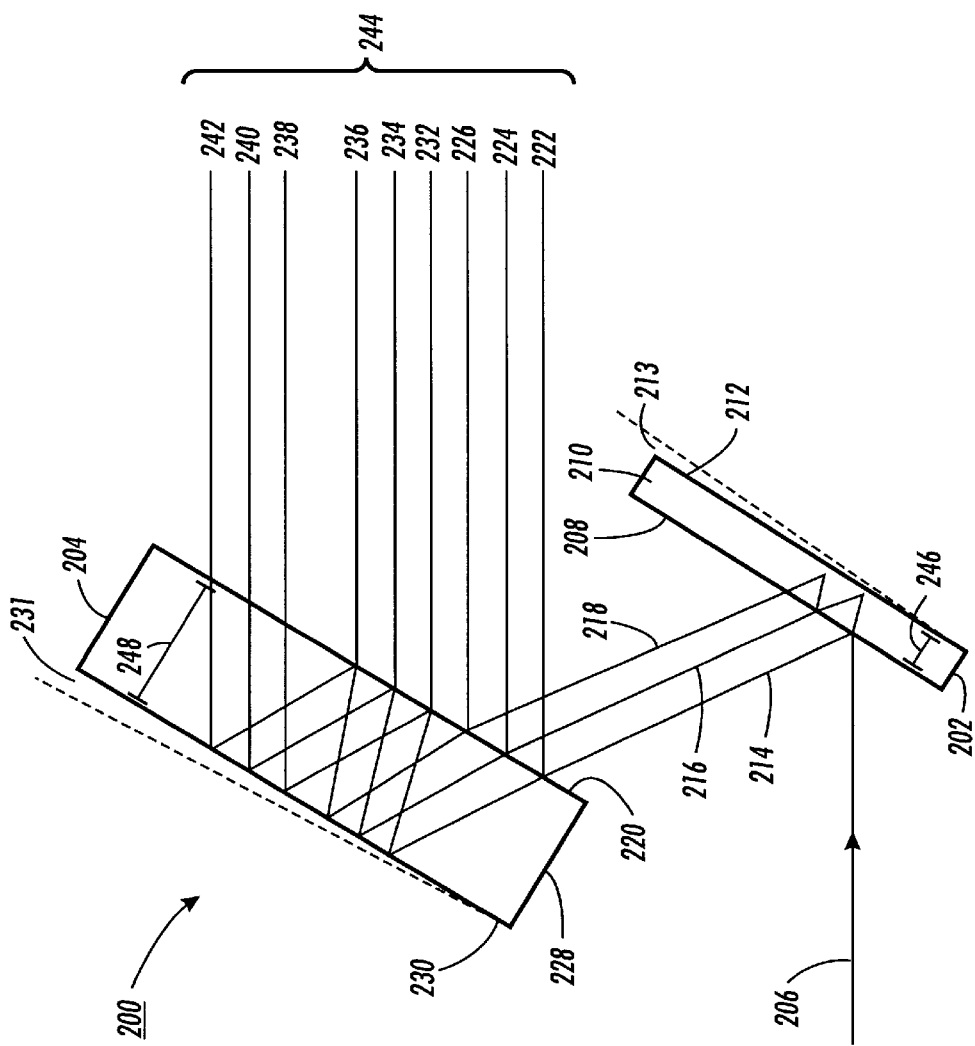
FIG. 3 is a schematic illustration of a beam conditioning optical system having two beam conditioner plates.

The beam conditioner 200 of FIG. 3 has a first beam conditioner plate 202 and a second beam conditioner plate 204 which are parallel but offset from each other. An excimer laser 205 emits a coherent light beam 206 which is incident upon the partially reflective surface 208 of the first beam conditioner plate 202. As explained previously, a portion 214 of the beam is reflected and a portion of the beam is transmitted through substrate 210 to be reflected by the totally reflective surface 212 back to the partially reflective surface 208. The totally reflective surface 212 is slightly less than parallel by an angle 213 with respect to the partially reflective surface 208. The substrate 210 of the first beam conditioner plate 202 has a thickness, d.

For ease of understanding in FIG. 3, the first beam conditioner plate 202 reflects the first three emergent reflective beams 214, 216 and 218. These three emergent reflective beams contain over 90 percent of the total intensity of the incident light beam 206. The second beam 216 will lag behind the first beam 214 by the OPD of the first beam conditioner plate and be slightly diverging from the first beam by a minute angular spread. The third beam 218 will lag behind the second beam 216 by the OPD (and be slightly diverging from the second beam by a minute angular spread) and behind the first beam 214 by twice the OPD (and be slightly more diverging from the first beam).

The three beams 214, 216 and 218 from the first beam conditioner plate 202 are incident upon the second beam conditioner plate 204. The partially reflective surface 220 of the second beam conditioner plate will reflect a portion of the three beams forming beams 222, 224 and 226. A portion of the three beams will be transmitted through the substrate 228 to be reflected by the totally reflective surface 230 back to the partially reflective surface 220. A portion will be transmitted forming beams 232, 234 and 236. A portion will be reflected, transmitted through the substrate, and reflected by the totally reflective surface back to the partially reflective surface. A portion will be transmitted forming beams 238, 240 and 242.

Thus, the three emergent reflected beams 214, 216 and 218 from the first beam conditioner plate 202 will yield nine emergent reflected beams 222, 224, 226, 232, 234, 236, 238, 240 and 242 from the second beam conditioner plate 204.

The totally reflective surface 230 of the second beam conditioner plate 204 is slightly less than parallel by an angle 231 with respect to the partially reflective surface 220. Each emergent reflected beam will be slightly diverging with a minute angular spread from the subsequent beam.

In the beam conditioner 200 of FIG. 3, the nine emergent reflected beams from the second beam conditioner plate 204 recombine and form a conditioned output beam 244 which is parallel, but offset, from the coherent input beam 206.

In a multiple element beam conditioner optical system, such as the two plate system 200 of FIG. 3, the first beam conditioner plate 202 has a thickness 246 of d. The second beam conditioner plate 204 has a thickness 248 of 3d. The thickness 248 of the second plate is 3 times that of the thickness 246 of the first plate. Since the tilt angle of the reflective surface of each beam conditioner plate is typically less than 1 degree and, more typically, in the microRadians range, the beam conditioner plates are presumed to have substantially uniform thicknesses.

If the second beam conditioner plate 204 was of the same thickness as the first beam conditioner plate 202, then the first order initial emergent reflected beam 214 from the first plate 202 which is subsequently reflected once within the second plate 204 to form beam 232 would have the same OPD as the second order emergent reflected beam 216 from the first plate 202 which is initially reflected by the second plate 204 to form beam 224. The OPD shifts within the plates would cancel and the two beams would interfere diffractively to form interference patterns within the beam intensity profile.

To avoid this interference pattern, the thickness 248 of the second plate is 3 times that of the thickness 246 of the first plate. Thus, none of the nine beams from the second plate 204 have mutually coherent regions which overlap within the beam's coherence length.

Figure 4:
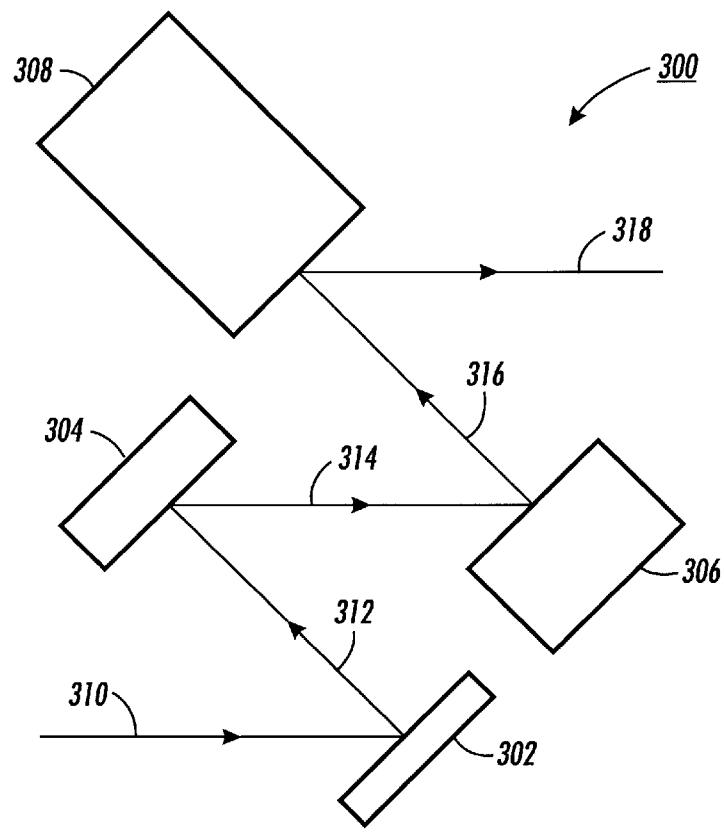
FIG. 4 is a schematic illustration of a first embodiment of a beam conditioning optical system having four beam conditioner plates for producing a parallel but offset conditioned beam.

The beam conditioner 300 of FIG. 4 has a first beam conditioner plate 302, a second beam conditioner plate 304, a third beam conditioner plate 306 and a fourth beam conditioner plate 308. An excimer laser 309 emits a coherent light beam 310 which is incident upon the partially reflective surface of the first beam conditioner plate 302. As explained previously, a portion of the beam is reflected and a portion of the beam is transmitted through substrate to be reflected by the totally reflective surface back to the partially reflective surface. For ease of understanding in FIG. 4, the first beam conditioner plate 302 reflects a single emergent reflected beam 312 which is the sum of the orders of emergent reflected beams, also as previously discussed. The totally reflective surface is less than parallel by a tilt angle from the partially reflective surface in each beam conditioner plate. And each emergent reflected beam from each beam conditioner plate is slightly diverging by a minute angular spread from the subsequent emergent reflected beam when combining to form the single emergent reflected beam.

The emergent reflected beam 312 is incident upon the second beam conditioner plate 304 which reflects an emergent reflected beam 314. The emergent reflected beam 314 is incident upon the third beam conditioner plate 306 which reflects an emergent reflected beam 316. The emergent reflected beam 316 is incident upon the fourth beam conditioner plate 308 which reflects an emergent reflected beam 318.

The first and second beam conditioner plates 302 and 304 are approximately parallel to each other but offset. The third and fourth beam conditioner plates 306 and 308 are approximately parallel to each other but offset. And, in FIG. 4, the second and third beam conditioner plates 304 and 306 are approximately parallel to each other but offset. Thus, the beam conditioner 300 of FIG. 4 has the output conditioned beam 318 parallel, but offset from, the input beam 310.

Figure 5:
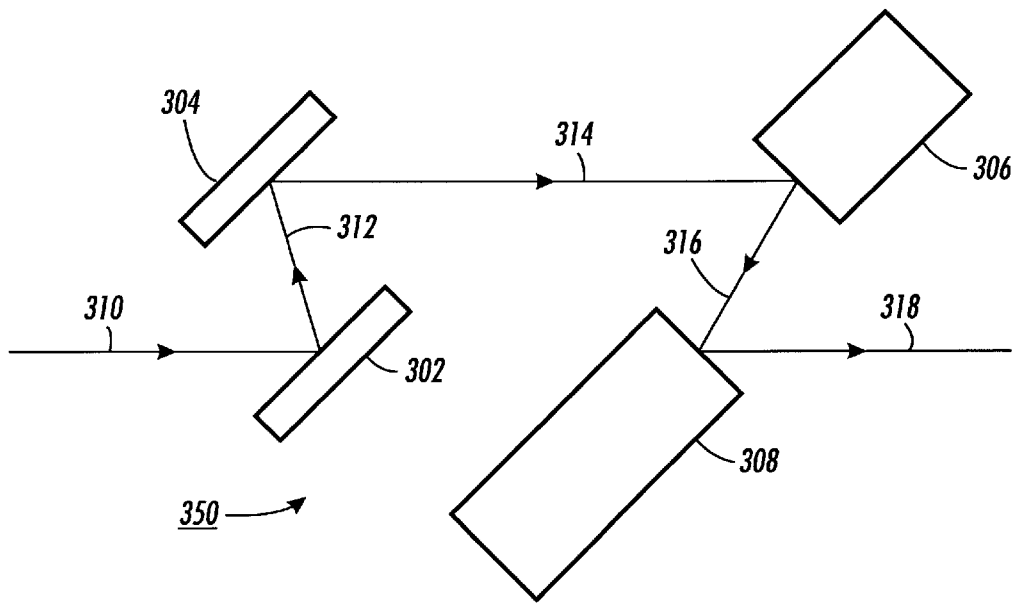
FIG. 5 is a schematic illustration of a second embodiment of a beam conditioning optical system having four beam conditioner plates for producing a coaxial conditioned beam.

In FIG. 5, using the same beam conditioner plates as FIG. 4 but with the second and third beam conditioner plates 304 and 306 at approximate right angles to each other, the beam conditioner 350 of FIG. 5 has the output conditioned beam 318 coaxial to the input beam 310.

For the reasons previously discussed, each succeeding beam conditioner plate must be thicker than the previous one to avoid overlapping of mutually coherent beams. The second plate 304 must be 3 times thicker than the first plate 302, the third plate 306 must be 3 times thicker than the second plate 304 and the fourth plate 308 must be 3 times thicker than the third plate 306. Thus, if the first plate 302 is 1 mm thick, the second plate 304 will be 3 mm thick, the third plate 306 will be 9 mm thick and the fourth plate 308 will be 27 mm thick. These thicknesses are not shown to scale in the Figures.

One problem inherent in multiple reflections and transmissions of a laser beam is edge blurring of the beam's intensity profile. The intensity profile for two beam conditioner plates is indistinguishable from the ideal input beam profile which is rectangular and uniform over the beam width.

The edges are significantly softened in the case of four beam conditioner plates. However, even with four plates, the top mesa of the intensity profile lies within 1 percent of its ideal value for about 90 percent of the original beam width. Whether this degree of edge blur is acceptable will depend upon the optical use of the beam conditioner optical system.

If a thickness multiplier factor of 2.5 times is used for the substrates of the conditioner plates, instead of 3 times, the edge blur is reduced. The small anticipated increase in intensity profile irregularity in the beam, associated with the smaller multiplier factor, may compensate for the observed edge blur improvement. The thickness multiplier is chosen to avoid mutually coherent regions of the orders of emergent reflected beams which overlap creating interference within the beam's coherence length.

The four plate conditioner 200 shown in FIG. 3 will induce about 10 nsec pulse broadening which should be acceptable. A pulse widening of 100 nsec would probably be unacceptable.

Spatial beam asymmetry begins to become severe after four beam conditioner plates. However, the use of a leaky prism, such as discussed in Muraki et al., as a final element following a number of beam conditioner plates, would tend to cancel existing asymmetries, would add no new edge blur and would provide a final conditioner element equally as effective at that task as an additional conditioner plate.

Figure 6:
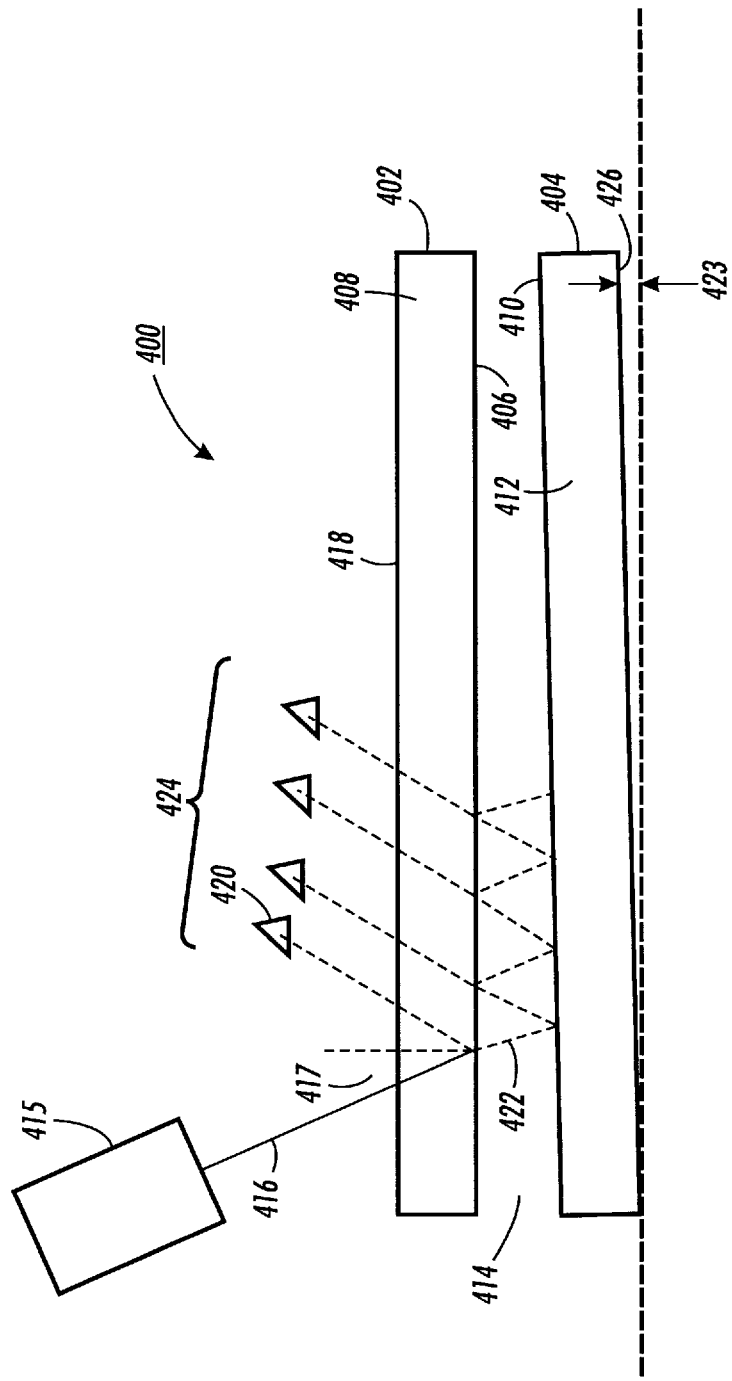
FIG. 6 is a schematic illustration of a beam conditioner having a partially reflective plate and a totally reflective plate formed according to the present invention.

The optical requirements for the present invention only call for the partially reflective surface to be separated by a distance at least half a coherence length of the laser beam from the totally reflective surface. These two reflective surfaces can be on two separate plates. As shown in FIG. 6, the beam conditioner 400 has a partially reflective plate 402 and a totally reflective plate 404. The partially reflective plate 402 has a partially reflective surface 406 on a first substrate 408. The totally reflective plate 404 has a totally reflective surface 410 on a second substrate 412. The two reflective surfaces can be fabricated by a dielectric mirror coating as is known in the art.

In this embodiment, the partially reflective surface 406 is separated by atmosphere 414 from the totally reflective surface 410.

An excimer laser 415 emits a coherent light beam 416 which is incident at a steep angle 417 of incidence to the surface 418 of the first conditioner plate 402 opposite the partially reflective surface 406. Typically, the angle of incidence of the input beam 416 will be within 5 degrees of normal to the surface 416.

The light beam 416 will be transmitted through the substrate 408 to the partially reflective surface 406.

A portion 420 of the incident beam 416 will be reflected by the surface 406 and a portion 422 will be refracted and transmitted through the atmosphere 414 to the totally reflective surface 410 on the second conditioner plate 404. The totally reflective surface 410 is slightly less than parallel by an angle 423 with respect to the partially reflective surface 406 in order to introduce a minute angular spread among the delayed components of the multiply reflected beam. The spacing between the partially and totally reflective surfaces is at least half the coherence length of the laser beam.

The laser beam which is not initially reflected from the partially reflective surface 406 will circulate by multiple reflection between the partially reflective surface 406 of the first plate 402 and the totally reflective surface 410 of the second plate 404 of the beam conditioner 400 and gradually be transmitted through the partially reflective surface with increasing slight divergence, increasing quantities of optical path difference delay and decreased intensities forming conditioned beam 424. The emergent reflected beam 424 will be transmitted through the substrate 408 to emerge from surface 418 of the first conditioner plate 402.

The surface 418 of the first conditioner plate 402 can have a non-reflective coating as is known in the art.

Alternately, the first conditioner plate 402 can be reversed in the optical path so that the light beam is first incident on the partially reflective surface with the transmitted portion being transmitted through the substrate, transmitted through the other surface, and transmitted through the atmosphere to the totally reflective surface on the second conditioner plate 404.

Also alternately, the second conditioner plate can be reversed so that the transmitted beam from the first conditioner plate is first incident on the surface 426 of the second conditioner plate 404 opposite the totally reflective surface 410. The light beam will be transmitted through the substrate 412 to the totally reflective surface 410. The surface 426 of the second conditioner plate 404 can have a non-reflective coating as is known in the art.

The beam conditioner 400 of FIG. 6 can be positioned in parallel but offset from another beam conditioner 400, as in the beam conditioner 200 of FIG. 3, to have the output conditioned beam parallel, but offset from, the input beam. Similarly, four beam conditioners 400 can be positioned, as in the beam conditioner 300 of FIG. 4, to have the output conditioned beam parallel, but offset from, the input beam, or, can be positioned as in the beam conditioner 350 of FIG. 5 to have the output conditioned beam coaxial to the input beam.

The beam conditioner of the present invention is of a simple design, inherently inexpensive and easy to manufacture. The substrate is constructed of flat plate glass and the principal fabrication cost is the cost of two dielectric mirror coating runs. Since many mirrors can be coated at once, mass production with its lower amortized costs is possible.

Although the illustrative example of the plate beam conditioner has a glass substrate and dielectric coatings for the partially reflective and totally reflective surfaces, alternative materials for the substrate and reflective surfaces may be used.

The substrate of the beam conditioner plate may be plastic, polymer or another suitable synthetic material. The only optical requirements for the substrate are that it be transmissive to the wavelength of the light beam, have a uniform index of refraction, have a uniform thickness and neither distort nor absorb the light beam.

The partially reflective surface mirror and the totally transmissive surface mirror of the beam conditioner plate need not be of the same material. These reflective surfaces may be a silvering coating or a thin film coating. The only optical requirements for the partially reflective surface are that it be partially reflective and partially transmissive for the wavelength of the light beam, have uniform reflectance, have uniform transmittance and neither distort nor absorb the light beam. The only optical requirements for the totally reflective surface are that it be totally reflective for the wavelength of the light beam, have uniform reflectance, have uniform transmittance and neither distort nor absorb the light beam.

The optical requirements for the present invention is that the totally reflective surface is slightly less than parallel by a tilt angle to the partially reflective surface. As shown in the Figures, the totally reflective surface is tilted at an angle from parallel. Alternately, the totally reflective surface can be the parallel surface with the partially reflective tilted at an angle from parallel.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. An optical system for reducing the interference contrast of a homogenized laser beam comprising
   a light source for emitting a coherent light beam,
   a homogenizer for homogenizing a light beam, and
   at least one beam conditioner plate having a transparent substrate of uniform thickness having two less than parallel opposing surfaces, a totally reflective mirror on one surface of said substrate and a partially reflective mirror on said opposing surface of said substrate, said partially reflective mirror having uniform reflectivity,
   wherein said coherent laser beam is incident at an angle to said partially reflective mirror such that a portion of said coherent laser beam is initially reflected and a portion of said coherent laser beam is transmitted to be multiply reflected between said totally reflective mirror and said partially reflective mirror within said beam conditioner plate, with a portion transmitted at said partially reflective mirror at each multiple reflection, said initially reflected portion of said coherent light beam and said transmitted portions of said multiply reflected beams forming a conditioned light beam for said homogenizer.

2. The optical system for reducing the interference contrast of a homogenized laser beam of claim 1 wherein said partially reflective mirror has a reflectivity of approximately 38.2 percent.

3. The optical system for reducing the interference contrast of a homogenized laser beam of claim 1 wherein said thickness of said at least one beam conditioner plate is at least half the coherence length of said coherent light beam.

4. The optical system for reducing the interference contrast of a homogenized laser beam of claim 1 wherein said two less than parallel opposing surfaces cause said transmitted portions of said multiply reflected beams to be diverging at said partially reflective mirror.

5. An optical system for reducing the interference contrast of a homogenized laser beam comprising
   a light source for emitting a coherent light beam,
   a homogenizer for homogenizing a light beam,
   a first beam conditioner plate having a first transparent substrate of uniform thickness having two less than parallel opposing surfaces, a first totally reflective mirror on one surface of said first substrate and a first partially reflective mirror on said opposing surface of said first substrate, said first partially reflective mirror having uniform reflectivity,
   wherein said coherent laser beam is incident at an angle to said first partially reflective mirror such that a portion of said coherent laser beam is initially reflected and a portion of said coherent laser beam is transmitted to be multiply reflected between said first totally reflective mirror and said first partially reflective mirror within said first beam conditioner plate, with a portion transmitted at said first partially reflective mirror at each multiple reflection, said initially reflected portion of said coherent light beam and said transmitted portions of said multiply reflected beams forming a first conditioned light beam, and
   a second beam conditioner plate having a second transparent substrate of uniform thickness having two less than parallel opposing surfaces, a second totally reflective mirror on one surface of said second substrate and a second partially reflective mirror on said opposing surface of said second substrate, said second partially reflective mirror having uniform reflectivity,
   wherein said first conditioned light beam is incident at an angle to said second partially reflective mirror such that a portion of said first conditioned light beam is initially reflected and a portion of said first conditioned light beam is transmitted to be multiply reflected between said second totally reflective mirror and said second partially reflective mirror within said second beam conditioner plate, with a portion transmitted at said second partially reflective mirror at each multiple reflection, said initially reflected portion of said first conditioned light beam and said transmitted portions of said multiply reflected beams forming a second conditioned light beam for said homogenizer.

6. The optical system for reducing the interference contrast of a homogenized laser beam of claim 5 wherein said second beam conditioner plate is parallel but offset from said first beam conditioner plate.

7. The optical system for reducing the interference contrast of a homogenized laser beam of claim 5 wherein the thickness of said second substrate of said second beam conditioner plate is larger than the thickness of said first substrate of said first beam conditioner plate, said thicknesses preventing diffractive interference between multiply reflected beams.

8. The optical system for reducing the interference contrast of a homogenized laser beam of claim 5 wherein said second conditioned light beam from said second beam conditioner plate is parallel but offset from said coherent laser beam incident to said first beam conditioner plate.

9. The optical system for reducing the interference contrast of a homogenized laser beam of claim 5 wherein said first and second partially reflective mirrors have a reflectivity of approximately 38.2 percent.

10. The optical system for reducing the interference contrast of a homogenized laser beam of claim 5 wherein said thickness of said first and second beam conditioner plates are at least half the coherence length of said coherent light beam.

11. The optical system for reducing the interference contrast of a homogenized laser beam of claim 5 wherein said two less than parallel opposing surfaces of said first beam conditioner plate cause said transmitted portions of said multiply reflected beams to be diverging at said first partially reflective mirror and said two less than parallel opposing surfaces of said second beam conditioner plate cause said transmitted portions of said multiply reflected beams to be diverging at said second partially reflective mirror.

12. An optical system for reducing the interference contrast of a homogenized laser beam comprising a light source for emitting a coherent light beam, a homogenizer for homogenizing a light beam, a first beam conditioner plate having a first transparent substrate of uniform thickness having two less than parallel opposing surfaces, a first totally reflective mirror on one surface of said first substrate and a first partially reflective mirror on said opposing surface of said first substrate, said first partially reflective mirror having uniform reflectivity, wherein said coherent laser beam is incident at an angle to said first partially reflective mirror such that a portion of said coherent laser beam is initially reflected and a portion of said coherent laser beam is transmitted to be multiply reflected between said first totally reflective mirror and said first partially reflective mirror within said first beam conditioner plate, with a portion transmitted at said first partially reflective mirror at each multiple reflection, said initially reflected portion of said coherent light beam and said transmitted portions of said multiply reflected beams forming a first conditioned light beam, a second beam conditioner plate having a second transparent substrate of uniform thickness having two less than parallel opposing surfaces, a second totally reflective mirror on one surface of said second substrate and a second partially reflective mirror on said opposing surface of said second substrate, said second partially reflective mirror having uniform reflectivity, wherein said first conditioned light beam is incident at an angle to said second partially reflective mirror such that a portion of said first conditioned light beam is initially reflected and a portion of said first conditioned light beam is transmitted to be multiply reflected between said second totally reflective mirror and said second partially reflective mirror within said second beam conditioner plate, with a portion transmitted at said second partially reflective mirror at each multiple reflection, said initially reflected portion of said first conditioned light beam and said transmitted portions of said multiply reflected beams forming a second conditioned light beam, a third beam conditioner plate having a third transparent substrate of uniform thickness having two less than parallel opposing surfaces, a third totally reflective mirror on one surface of said third substrate and a third partially reflective mirror on said opposing surface of said third substrate, said third partially reflective mirror having uniform reflectivity, wherein said second conditioned light beam is incident at an angle to said third partially reflective mirror such that a portion of said second conditioned light beam is initially reflected and a portion of said second conditioned light beam is transmitted to be multiply reflected between said third totally reflective mirror and said third partially reflective mirror within said third beam conditioner plate, with a portion transmitted at said third partially reflective mirror at each multiple reflection, said initially reflected portion of said second conditioned light beam and said transmitted portions of said multiply reflected beams forming a third conditioned light beam, and a fourth beam conditioner plate having a fourth transparent substrate of uniform thickness having two less than parallel opposing surfaces, a fourth totally reflective mirror on one surface of said fourth substrate and a fourth partially reflective mirror on said opposing surface of said fourth substrate, said fourth partially reflective mirror having uniform reflectivity, wherein said third conditioned light beam is incident at an angle to said fourth partially reflective mirror such that a portion of said third conditioned light beam is initially reflected and a portion of said third conditioned light beam is transmitted to be multiply reflected between said fourth totally reflective mirror and said fourth partially reflective mirror within said fourth beam conditioner plate, with a portion transmitted at said fourth partially reflective mirror at each multiple reflection, said initially reflected portion of said third conditioned light beam and said transmitted portions of said multiply reflected beams forming a fourth conditioned light beam for said homogenizer.

13. The optical system for reducing the interference contrast of a homogenized laser beam of claim 12 wherein said fourth beam conditioner plate is parallel but offset from said third beam conditioner plate and said second beam conditioner plate is parallel but offset from said first beam conditioner plate.

14. The optical system for reducing the interference contrast of a homogenized laser beam of claim 12 wherein the thickness of said fourth substrate of said fourth beam conditioner plate is larger than the thickness of said third substrate of said third beam conditioner plate, the thickness of said third substrate of said third beam conditioner plate is larger than the thickness of said second substrate of said second beam conditioner plate, and the thickness of said second substrate of said second beam conditioner plate is larger than the thickness of said first substrate of said first beam conditioner plate, said thicknesses preventing diffractive interference between multiply reflected beams.

15. The optical system for reducing the interference contrast of a homogenized laser beam of claim 12 wherein said fourth conditioned light beam from said fourth beam conditioner plate is parallel but offset from said coherent laser beam incident to said first beam conditioner plate.

16. The optical system for reducing the interference contrast of a homogenized laser beam of claim 12 wherein said fourth conditioned light beam from said fourth beam conditioner plate is coaxial to said coherent laser beam incident to said first beam conditioner plate.

17. The optical system for reducing the interference contrast of a homogenized laser beam of claim 12 wherein said first, second, third and fourth partially reflective mirrors have a reflectivity of approximately 38.2 percent.

18. The optical system for reducing the interference contrast of a homogenized laser beam of claim 12 wherein said thickness of said first, second, third and fourth beam conditioner plates are at least half the coherence length of said coherent light beam.

19. An optical system for reducing the interference contrast of a homogenized laser beam comprising a light source for emitting a coherent light beam, a homogenizer for homogenizing a light beam, and a partially reflective mirror on a first substrate and a totally reflective mirror on a second substrate, said partially reflective mirror and said totally reflective mirror being less than parallel, said partially reflective mirror having uniform reflectivity, wherein said coherent laser beam is incident at an angle to said partially reflective mirror such that a portion of said coherent laser beam is initially reflected and a portion of said coherent laser beam is transmitted to be multiply reflected between said totally reflective mirror and said partially reflective mirror, with a portion transmitted at said partially reflective mirror at each multiple reflection, said initially reflected portion of said coherent light beam and said transmitted portions of said multiply reflected beams forming a conditioned light beam for said homogenizer.

20. The optical system for reducing the interference contrast of a homogenized laser beam of claim 19 wherein said partially reflective mirror has a reflectivity of approximately 38.2 percent.

21. The optical system for reducing the interference contrast of a homogenized laser beam of claim 19 wherein said partially reflective mirror is separated from said totally reflective mirror by at least half the coherence length of said coherent light beam.

22. The optical system for reducing the interference contrast of a homogenized laser beam of claim 19 wherein said partially reflective mirror and said totally reflective mirror being less than parallel cause said transmitted portions of said multiply reflected beams to be diverging at said partially reflective mirror.

23. The optical system for reducing the interference contrast of a homogenized laser beam of claim 19 wherein said coherent laser beam is transmitted through said first substrate to said partially reflective mirror.

24. The optical system for reducing the interference contrast of a homogenized laser beam of claim 19 wherein said portion of said coherent laser beam is transmitted through said first substrate.

* * * * *